F. H. HALSTEAD.
GRINDER.
APPLICATION FILED JUNE 16, 1917.

1,299,714.

Patented Apr. 8, 1919.
9 SHEETS—SHEET 2.

Inventor:
Frederick H. Halstead.
by Emery Booth Janney & Varney
Attys.

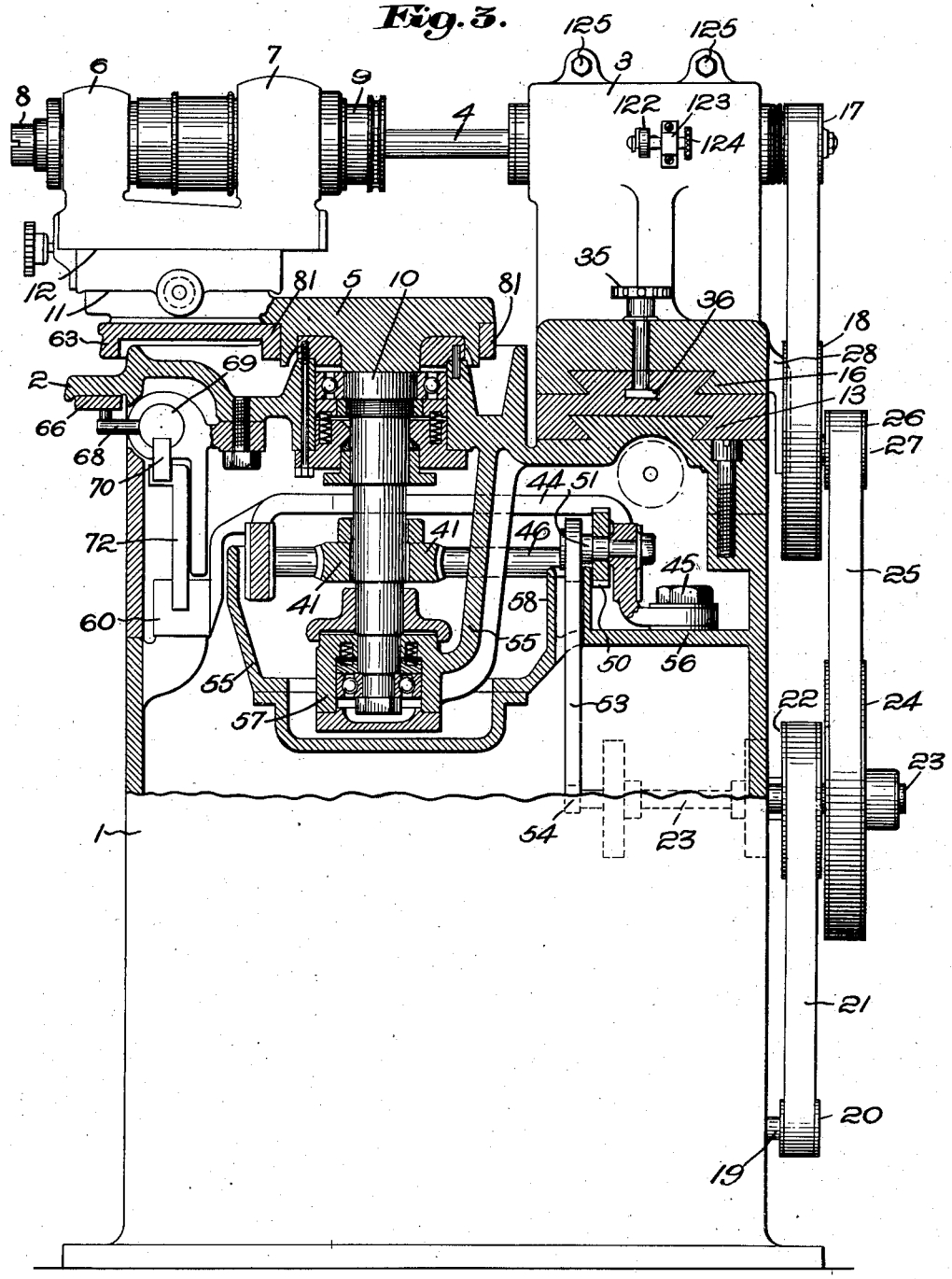

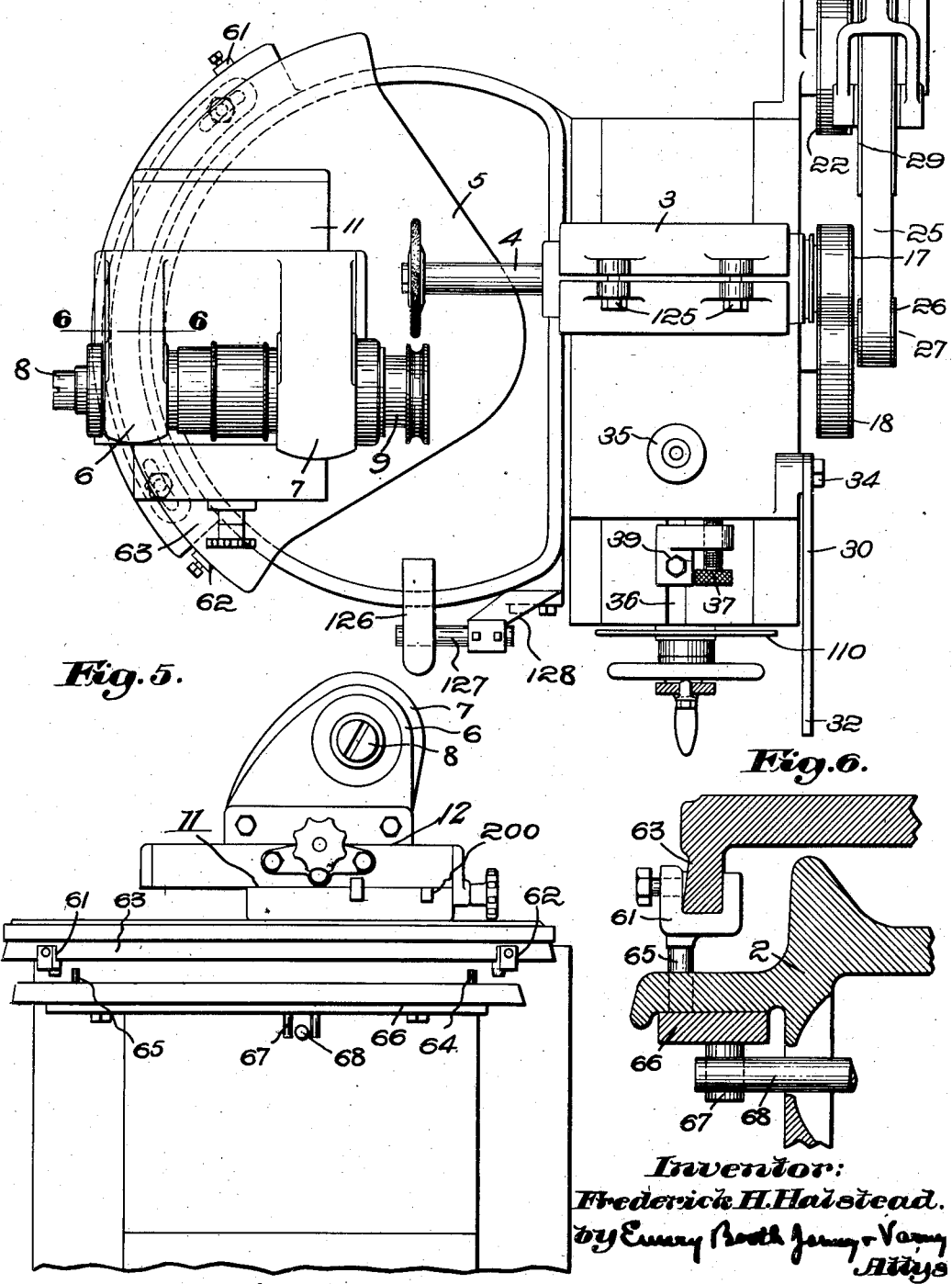

F. H. HALSTEAD.
GRINDER.
APPLICATION FILED JUNE 16, 1917.

1,299,714.

Patented Apr. 8, 1919.
9 SHEETS—SHEET 5.

Inventor:
Frederick H. Halstead.
by Emery Booth Janney & Varney
Attys.

F. H. HALSTEAD.
GRINDER.
APPLICATION FILED JUNE 16, 1917.
1,299,714.
Patented Apr. 8, 1919.
9 SHEETS—SHEET 6.
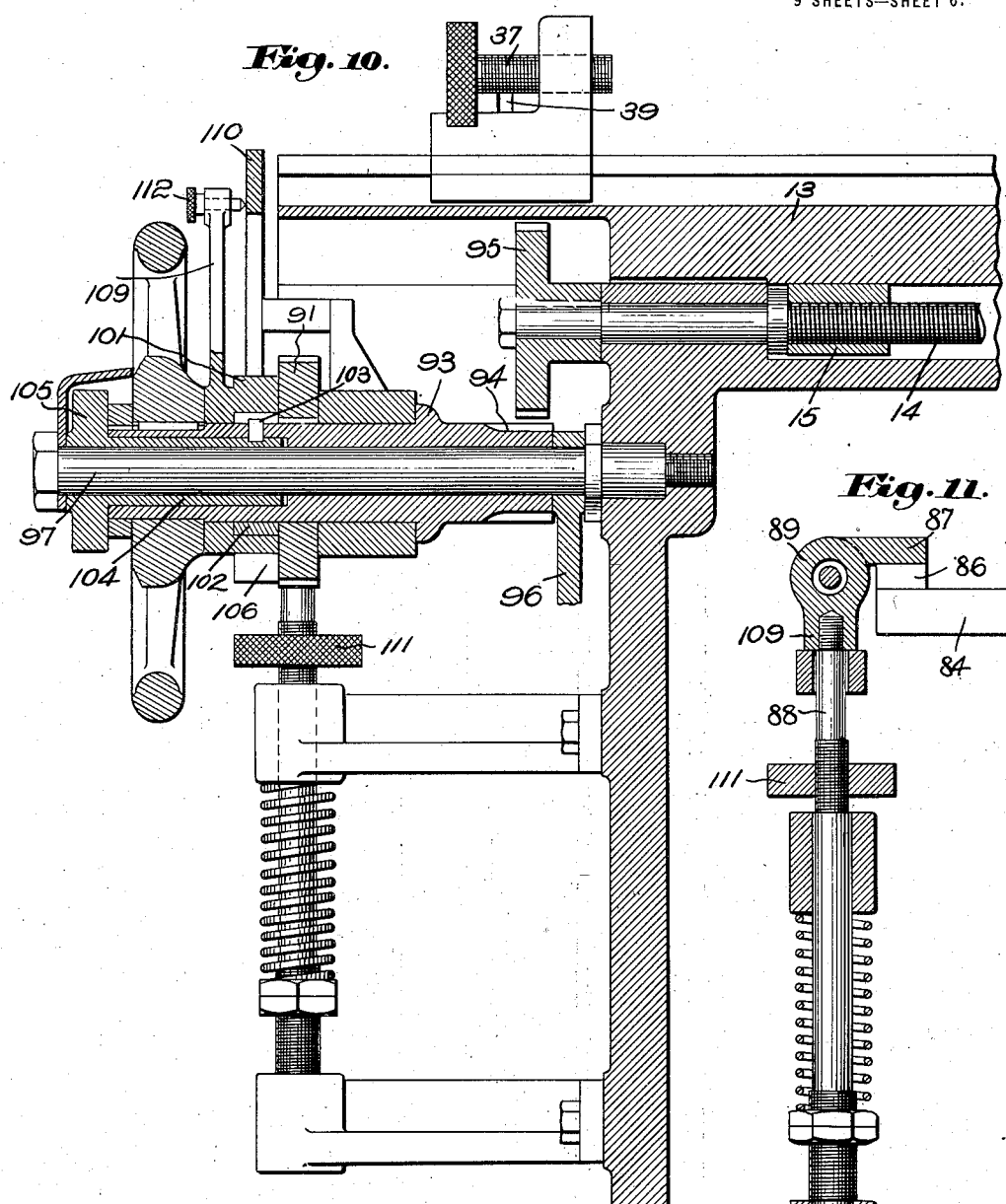
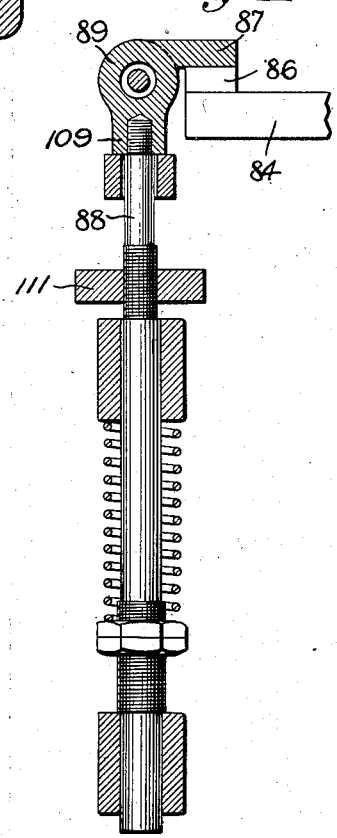
Inventor:
Frederick H. Halstead.
by Emery Booth Janney & Varney
Attys.

F. H. HALSTEAD.
GRINDER.
APPLICATION FILED JUNE 16, 1917.
1,299,714.
Patented Apr. 8, 1919.
9 SHEETS—SHEET 7.
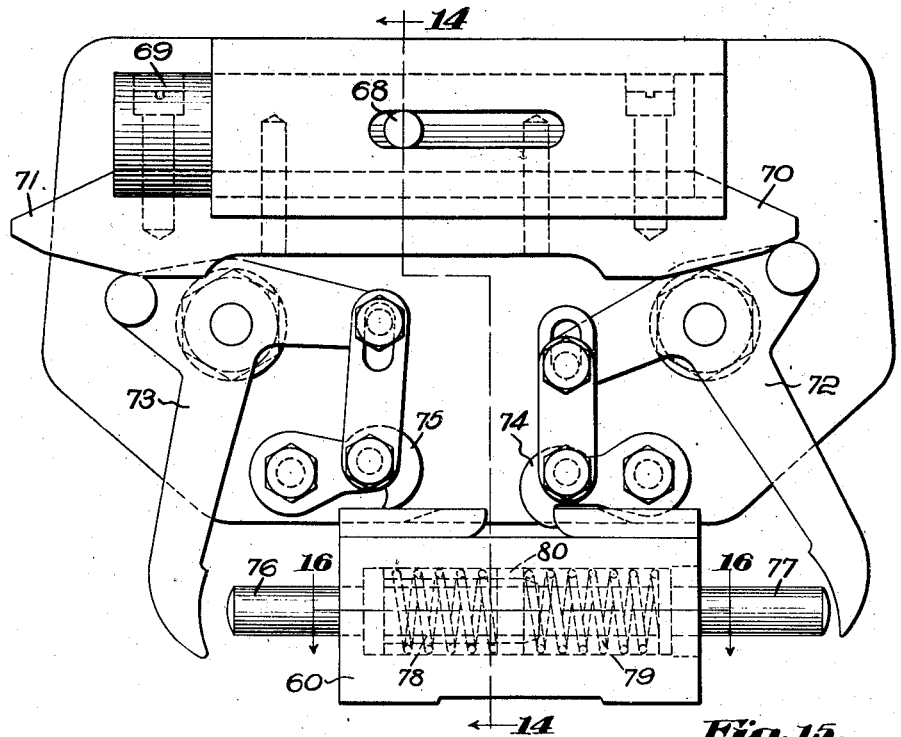
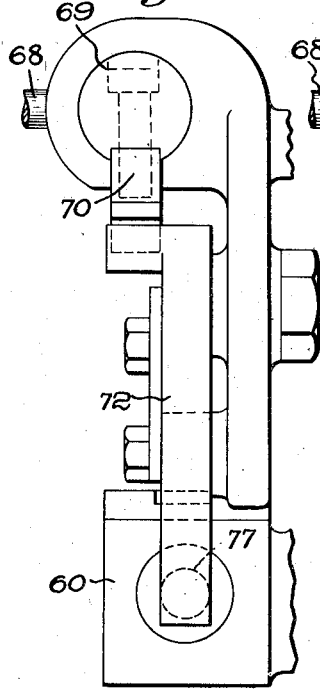
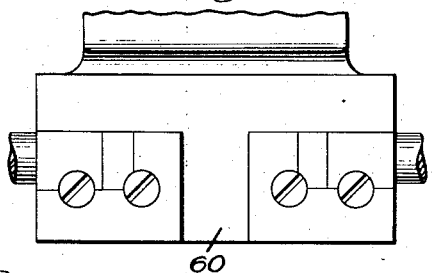
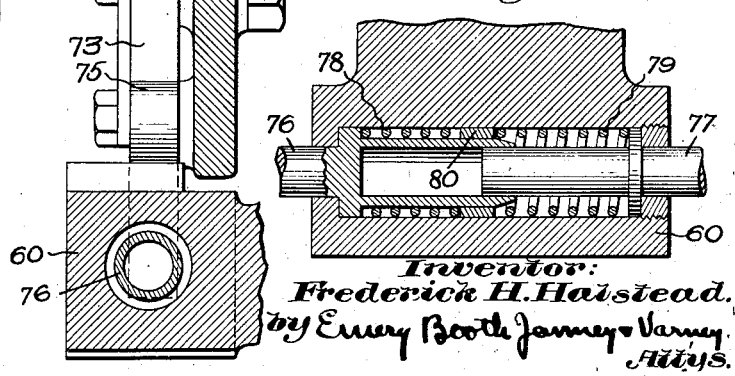
Inventor:
Frederick H. Halstead.
by Emery Booth Janney & Varney.
Attys.

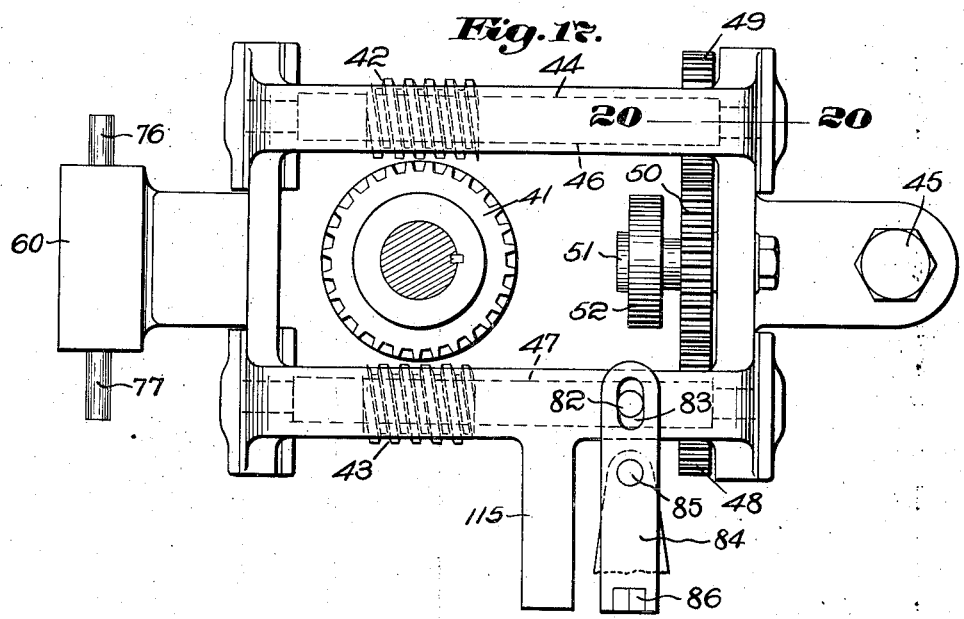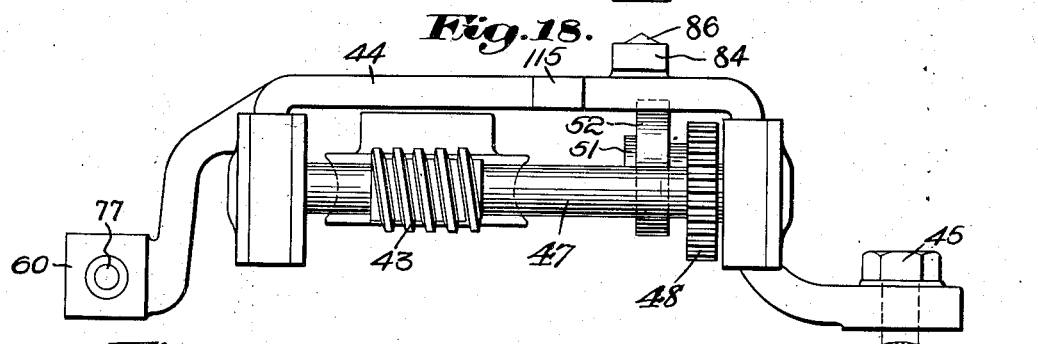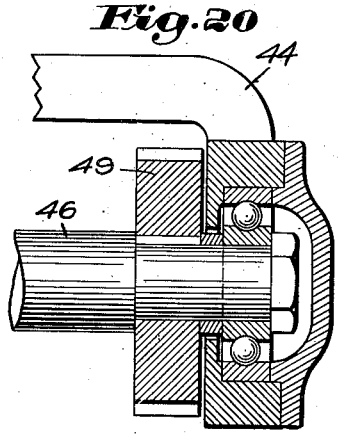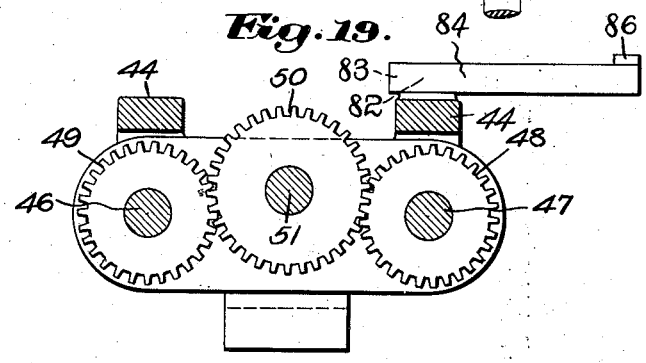

F. H. HALSTEAD.
GRINDER.
APPLICATION FILED JUNE 16, 1917.

1,299,714.

Patented Apr. 8, 1919.
9 SHEETS—SHEET 9.

Inventor:
Frederick H. Halstead,
by Emery Booth Janney & Varney.
Attys.

UNITED STATES PATENT OFFICE.

FREDERICK H. HALSTEAD, OF BOSTON, MASSACHUSETTS, ASSIGNOR TO RIVETT LATHE AND GRINDER COMPANY, OF FANEUIL, MASSACHUSETTS, A CORPORATION OF MASSACHUSETTS.

GRINDER.

1,299,714.  Specification of Letters Patent.  Patented Apr. 8, 1919.

Application filed June 16, 1917. Serial No. 175,142.

*To all whom it may concern:*

Be it known that I, FREDERICK H. HALSTEAD, a citizen of the United States, and a resident of Boston, county of Suffolk, and State of Massachusetts, have invented an Improvement in Grinders, of which the following description, in connection with the accompanying drawings, is a specification, like characters on the drawings representing like parts.

This invention pertains to improvements in grinders, and more particularly, though not exclusively, to improvements in machines and mechanisms adapted for grinding surfaces curved in two dimensions, such as the internal and external races of ball bearings, and the races of thrust ball bearings. The illustrative machine selected as a preferred embodiment of my invention is also adapted for the grinding of spherical surfaces such as the balls and sockets of ball and socket joints.

Among the objects of the invention are to provide a machine of relatively simple construction adapted to perform very accurate work of a variety of different kinds, without a substantial reorganization, a machine which is rapid in its operation and to a large extent automatic. Other objects of the invention will appear in the specification.

Referring to the drawings:

In Figure 1 I have shown a side elevation of a preferred embodiment constituting one illustrative form of my invention;

Fig. 3 is a vertical section, partly in elevation, taken on the longitudinal center line of the machine;

Fig. 4 is a plan of the machine shown in Fig. 1;

Fig. 5 is an end elevation of the machine taken from the left of Fig. 1;

Fig. 6 is a vertical section, partly in elevation, on the line 6—6 of Fig. 4, and shows the detail of the preferred form of reversing mechanism;

Fig. 10 is a vertical section, partly broken away and partly in elevation, on the line 10—10 of Fig. 1, and shows the feed mechanism on an enlarged scale;

Fig. 11 shows another detail of the feed mechanism and is more fully described hereafter;

Fig. 12 is an elevation showing a detail of the preferred form of reverse shifting mechanism;

Fig. 13 is an end elevation of the mechanism shown in Fig. 12;

Fig. 14 is a vertical section on the line 14—14 of Fig. 12;

Fig. 15 shows in plan a detail of mechanism shown in Fig. 12;

Fig. 16 is a horizontal section on line 16—16 of Fig. 12, through that portion of such mechanism which is shown in plan in Fig. 15;

Fig. 17 is a plan of shifting worm cage and associated parts shown in Fig. 3;

Fig. 18 is a side elevation of the worm cage and parts shown in Fig. 17;

Fig. 19 is a vertical section, partly in elevation, on the line 19—19 of Fig. 17;

Fig. 20 is a vertical section, partly in elevation, on the line 20—20 of Fig. 17;

Figure 1:
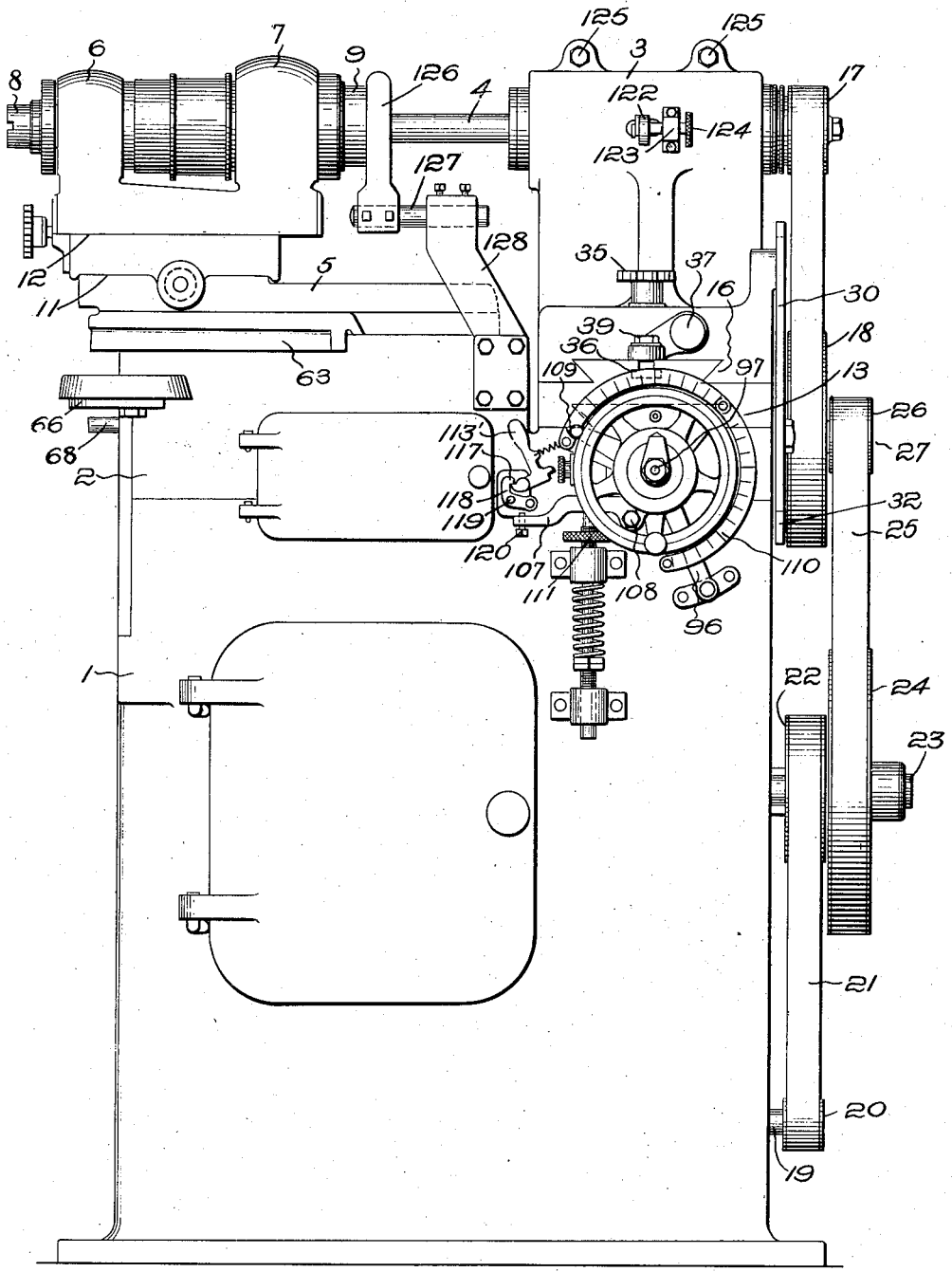
Figure 2:
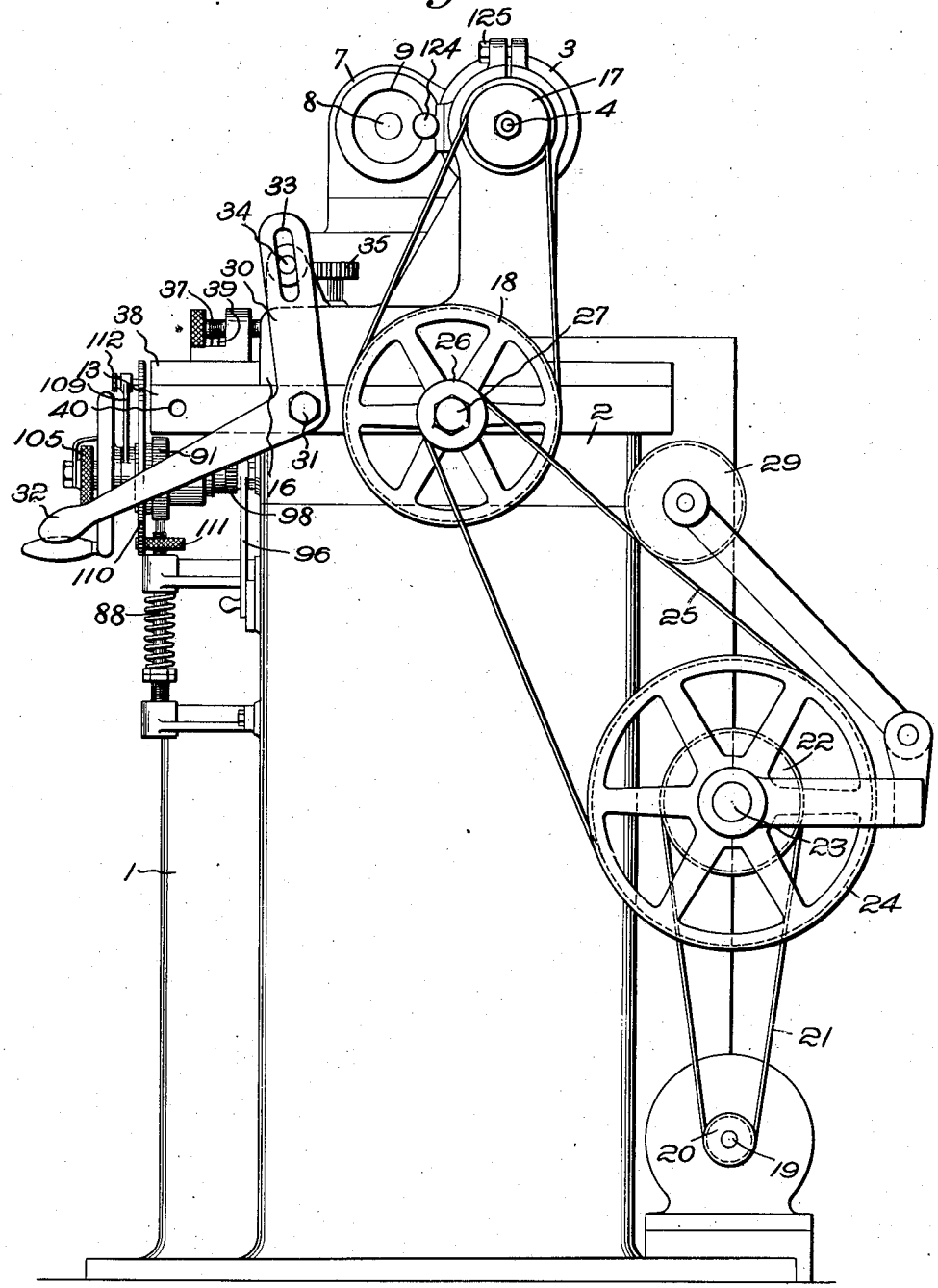
Fig. 2 is an end elevation thereof taken from the right of Fig. 1.

Referring to Figs. 1 and 2, in the illustrative embodiment of my invention, I have shown an oscillating grinder having a frame divided into two portions, a lower portion 1 and an upper portion 2, the latter carrying a journal 3 for the tool spindle 4 and an oscillatory support 5 for journals 6, 7 of the work spindle 8. The work spindle 8 is adapted to receive on its inner end a suitable chuck 9 carrying the work with the axis of the arcuate portion to be ground directly over the center of the oscillating post 10. To provide for adjustment of the work spindle 8 relative to the axis of the oscillatory post 10, for the purpose of adapting the machine for different classes of work and for work of different dimensions I have shown a slide 11 on the oscillatory support 5 adapted to permit adjustment of the work spindle 8 in a direction transverse to its axis and relative to the axis of the oscillatory post 10. I have also provided a slide 12 adapted to permit adjustment of the position of the work spindle 8 in a direction lengthwise of its axis.

Under the tool head 3 of the tool spindle 4 I have shown two slides transverse to the axis of the tool spindle, the lower slide 13 preferably as shown being a feed slide, and preferably being adapted to be fed transversely of the machine by the rotatable screw 14 passing through a nut 15 (Fig. 10) attached to the feed slide 13. Carried by the feed slide 13 I preferably provide a positioning slide 16, which, in the present embodiment of my invention, permits adjustment of the work spindle 4 relative to the axis of the oscillatory post 10 for different classes of work, and also permits the tool to be separated from the work for gaging, and for insertion and removal of work in the chuck 9 of the tool spindle 8. Among other advantages of the before-described mechanism providing for separation of the work and tool may be mentioned the fact that the tool may be separated from the work while the work is facing the operator, while in the more usual types of oscillatory grinders (in which a longitudinal slide is provided transverse to the feed slide) the work support, especially when grinding internal annular ball races, must be stopped with the face of the grinder away from the operator, the tool withdrawn from the work along the line of the longitudinal slide, and the work support then swung about the oscillatory pivot so that the work faces the operator to permit gaging of the work and insertion or removal thereof from the chuck. Another disadvantage of the more usual type of machine is that when the tool support is moved along the longitudinal slide toward the work, the tool may not assume exactly the same position longitudinally which it occupied during the previous grinding operation. With the present arrangement, the longitudinal adjustment of the work spindle, when once set, remains fixed throughout any series of grinding operations. A third advantage of the present arrangement over a machine having the longitudinal slide is that the pulley 17 on the tool spindle 4 is never moved out of alinement with its driving pulley 18. This enables me to greatly simplify the drive of the machine, which may comprise an electric motor having a shaft 19 carrying the pulley 20 which, by a belt 21, drives the pulley 22 on the countershaft 23 which carries the pulley 24. The pulley 24 by a belt 25 drives the pulley 26 on the stud 27. The driving pulley 18 is attached to the pulley 26 and rotates therewith on the stud 27. The stud 27 is tapped into a lug 28 depending from the positioning slide 16 (Fig. 3). The idler 29 (Fig. 2) tensions the belt 25 when the tool spindle 4 is moved transversely of the machine either by the movement of the feed slide 13 or by movement of the positioning slide 16. The stud 27 and the work spindle 4 are both carried by the same element and no change in their relative centers will be effected by transverse positioning or feeding movement of the work spindle. The transverse positioning movement of the positioning slide 16 relative to the feed slide 13 may be actuated by a bell-crank lever 30 (Fig. 2) fulcrumed at 31 on the feed slide, and provided at one end with a handle 32 and at the other end with a slot 33 for engagement with a pin 34 carried by the positioning slide 16. The positioning slide 16 may be clamped rigidly relative to the feed slide 13 by a hand-nut 35 on a bolt having its head in a slot 36 lengthwise of the feed slide 13. In the position shown in Fig. 2 the tool spindle 4 and the work spindle 8 are shown in their proper relative positions for grinding exterior annular races. When it is desired to separate the work and tool, the work spindle is stopped (preferably by mechanism hereinafter described) with the chuck on the work spindle facing toward the front of the machine (the left of Fig. 2). The hand-nut 35 is then loosened and the handle 32 raised to rock the lever 30 and push the positioning slide and the tool spindle to the right, as viewed in Fig. 2. The work may then be gaged, removed from the chuck, and new work inserted. In the event that the work is found to be insufficiently ground, the handle 32 is depressed until the positioning slide 16 abuts on the adjusting screw 37, after which the hand-nut 35 is again clamped, and the grinding operation resumed.

When the machine is to be used for grinding interior annular races, for grinding balls or sockets, abutment 38 carrying the abutment screw 37 is removed from the lefthand side of the feed slide (Fig. 2) by loosening the nuts 39 (Fig. 1), and is inserted in the opposite end of the slot 36 so that the abutment screw 37 will limit the movement of the positioning slide 16 relative to the feed slide 13 in its traverse toward the right, as viewed in Fig. 2. When the machine is used for grinding interior annular races, balls and sockets, the position of slide 16 is preferably moved considerably to the left as viewed in Fig. 2, the pivot 31 being preferably shifted to position 40.

The drive for the oscillatory mechanism may resemble somewhat that shown in my copending application Serial No. 130,062, filed Nov. 7, 1916, comprising the worm gear 41 mounted on the oscillatory post 10 and adapted to be alternately engaged by worms 42, 43 carried by a worm cage 44 pivoted at 45. The worm carrying shafts 46, 47 are preferably driven through gears 48, 49, which are engaged by the driving gear 50 on a stud 51. Power is imparted to the driving gear 50 through a sprocket 52 attached thereto, which is preferably driven (Fig. 3) by a silent chain 53 from a sprocket 54 on the countershaft 23. In machines of the character described, it is highly desirable that the working parts should be protected from the emery-dust as much as is possible, that they should run in oil and that the work of assembly and disassembly be reduced to a minimum, while the accuracy of alinements is assured. To this end I have, as before mentioned, constructed the frame of the machine in two parts, of which the lower part 1 carries a pan 55 supporting at 56 the fulcrum 45 of the worm cage 44. The upper and lower bearings of the oscillatory post 10 are preferably both carried by the upper frame portion 2, a depending arm 55 being adapted to project down through the worm cage 44 to carry the lower bearing 57. Thus the worm cage 44 may be assembled with the frame portion 1 and the oscillatory post assembled with the frame portion 2, its worm 41 and lower bearing 57; the upper portion of the frame, with its assembled parts, being lowered in place on to the lower frame 1. During this operation, the worm cage 44 should be in central position so that the worm gear 41 may pass between the worms 42 and 43 without interference. The stud 51 is preferably, as shown, positioned on a higher level than the worm shafts 46 and 47, and the opening through which the silent chain 53 passes to the driving sprocket 54 is preferably surrounded by walls 58 so that the oil chamber 55 may be filled with oil to position at or near the center line of the worm-carrying shafts 46 and 47, the stud 51 being oiled by lubricants carried up by the gear 50, the bottom of which is running in oil. The worm cage 44 is so shaped that its operation in no way interferes with the retention of oil in the pan 55.

Swinging movement is imparted to the worm cage 44, to cause alternate engagement of the worms 42 and 43 with the worm gear 41, by any suitable mechanism, but I prefer to provide the worm cage 44 with a depending projection 60 at its outer end, which projection 60 is shifted by mechanism best shown in Figs. 4, 5, 6, 12, 13, 14, 15 and 16, comprising tappets 61, 62 adjustably positioned on a depending lip 63 carried by the oscillatory work support 5. The tappets 61, 62 are preferably staggered to coöperate respectively with projections 64, 65 carried by a curved plate 66, which has provision for about two inches of arcuate movement relative to the frame 2. The 67, having a hole therein through which passes the pin 68 projecting from the slidable shaft 69 (Figs. 3, 12, 13 and 14). The slidable shaft 69 carries cams 70, 71 adapted to rock levers 72, 73 and to engage and disengage latches 74, 75 with the projecting end 60 of the worm cage 44. The end 60, as best shown in Fig. 16, is bored transversely to receive plungers 76, 77, effective to compress springs 78 and 79 respectively, each of said springs bearing against a collar 80 slidably carried in the worm cage 44. The projection 64 (Fig. 5) is positioned so that it will be engaged by the tappet 61, while the projection 65 is positioned so that it will be engaged by the tappet 62. Therefore the amount of oscillation imparted to the work-carrying oscillatory support 5 represents a greater number of degrees of travel relative to the axis of said oscillatory support than the number of degrees between the tappets 61 and 62. This is of marked advantage, especially where an oscillatory grinder is intended for use in grinding thrust bearings and balls as well as radial roller bearings, because the positioning of the work support about its axis is not unduly limited by an extended tappet support.

Where the machine is to be changed from the grinding of radial roller bearings to thrust roller bearings or to the grinding of balls or sockets, the tappet support 81 is loosened from the oscillatory work support 5 and turned relative thereto, as best shown in Fig. 3.

Feed mechanism for the machine may be, and preferably is, actuated by shifting of the worm cage 44. To this end I may provide a pin 82 (Fig. 17) engaging a slot 83 in a lever 84 fulcrumed at 85 on a projection from the frame of the machine and carrying at its outer end wedge-cam 86 adapted to coöperate with an improved feed mechanism which, while of general application, I have elected to disclose in connection with the oscillatory grinder.

Referring now to Figs. 7, 8, 9, 10 and 11, I have shown (Fig. 11) the lever 84 carrying the wedge-cam 86 engaging the wedge-shaped projection 87 on the top of a reciprocable rod 88 carrying at 89 the pawl 90 engaging the ratchet 91. The ratchet 91 is fast on a sleeve 93, in which is formed the pinion 94 adapted to drive the gear 95 mounted on the feed screw 14. The unidirectional rotation of the ratchet 91 may impart rotation to the feed screw 14 in either direction as desired, by shifting a lever 96 fulcrumed on the same stud 97 which carries the sleeve 93, the shifting of said lever 96 serving to connect the pinion 94 with the gear 95 through a single pinion 98 or through two pinions 99 and 100, thus feed. Thus shifting the worm carriage 44 by rocking the lever 84 will impart to and fro movement to the pawl 90, thereby rotating in step-by-step movement the ratchet 91, which may be transmitted to the feed screw 14 in either direction desired. In the illustrative machine selected as a preferred embodiment of my invention, the feed screw draws the tool spindle toward the operator when grinding external annular races, but thrusts the tool spindle from the operator when grinding internal annular races and when grinding balls or sockets.

In abrasive processes, as well as in other forms of machine work, it is desirable to provide a feed which is relatively coarse during the initial reducing operation, but which grows gradually less as completion of the work is approached. While this operation is quite usual in hand-operated machines, no satisfactory automatic mechanism for performing this function has been heretofore provided. It is among the objects of the present invention to provide feed mechanism adapted to progressively reduce the amount of relative feed imparted to the tool and work. The mechanism hereinafter described may provide for an initial feed of six teeth, then five teeth, four teeth, three teeth, two teeth and one tooth; it may provide for a constant feed of either six, or five, or four, or three, or two teeth, or one tooth; or it may provide for a constant feed of any one of the foregoing number of teeth, followed automatically by a gradual reduction to zero as the finishing cut is approached.

Figure 7:
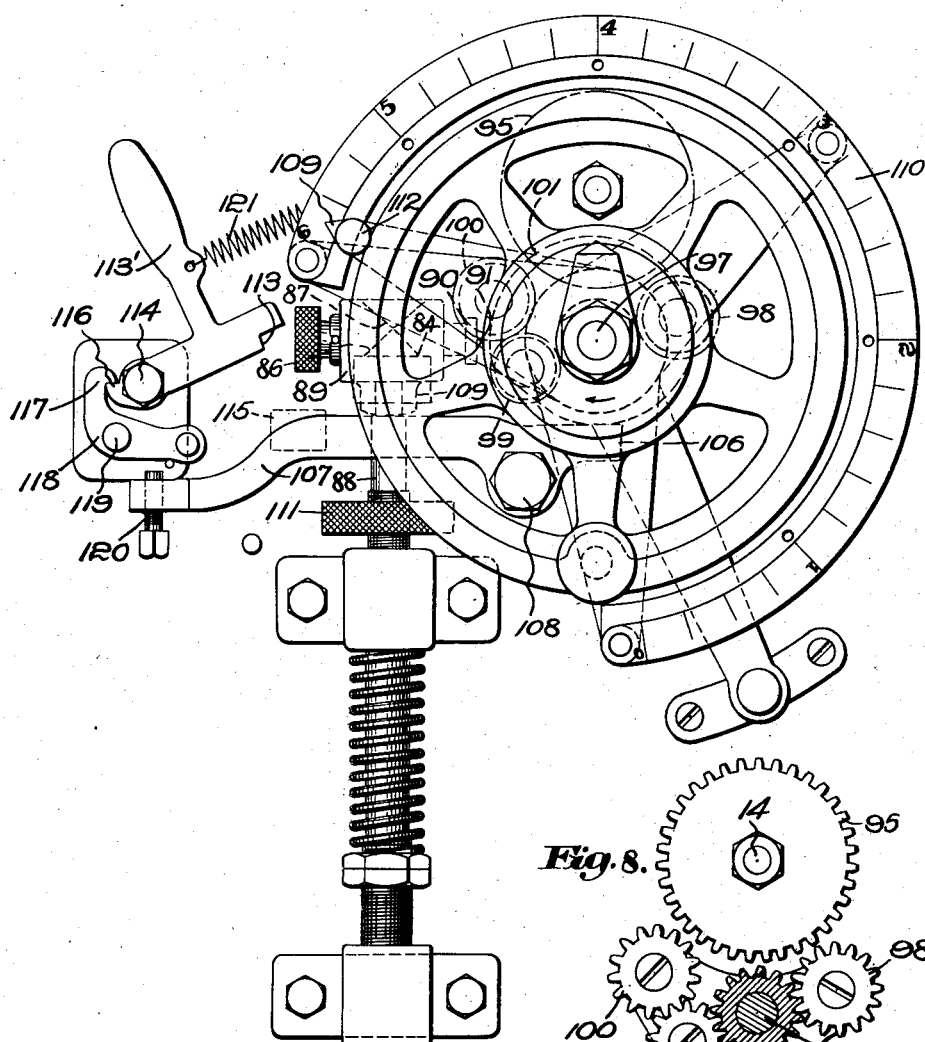
Fig. 7 is an enlarged view showing details of an improved form of grinder feed mechanism which is shown in Fig. 1, and which, while of general application to any kind of grinder, is peculiarly well adapted for use in connection with grinders of the class described.
Figure 8:
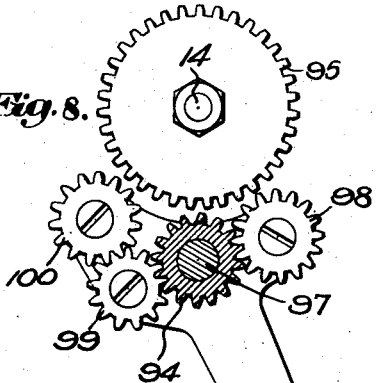
Figs. 8 and 9 show details of the feed mechanism, and are hereinafter more fully described.
Figure 9:
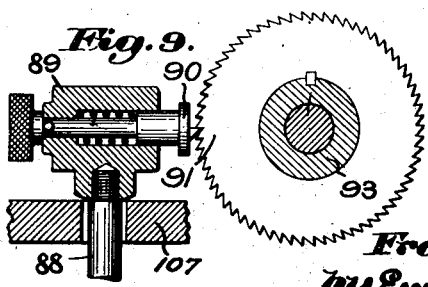

I perform the above types of feed by a very simple mechanism entirely automatic in its operation. I have shown a cam 101 mounted on the sleeve 93, which carries a ratchet 91, said cam 101 being adapted to be engaged with or loosened from the sleeve 93 by any suitable clutch mechanism typified by the split ring 102 adapted to be expanded by a pin 103 carried by a sleeve 104, which is adapted to be turned by a thumb-nut 105. Turning of thumb-nut 105 relative to the sleeve 93 in one direction locks the cam 101 on the sleeve 93, while turning of said nut 105 in the opposite direction releases said cam from the sleeve 93. The cam 101 is preferably, as best shown in Fig. 7, of scroll contour and adapted to engage the lip 106 of a lever 107 fulcrumed at 108. The lever 107 is drilled (Fig. 11) to slidably engage the reciprocable pawl rod 88, and is so positioned relative to said rod as to engage a projection thereon typified by the bottom 109 of the pawl-carrying element 89. When the cam 101 is locked relative to the sleeve 93, it will turn with the ratchet 91 in the direction shown by the arrow in Fig. 7. The cam pressing against the lip 106 will rock the lever 107 about the fulcrum 108, thereby gradually elevating the reciprocable rod 88 and automatically decreasing the amount which the pawl 90 can travel on its downward stroke. A pointer 109, shown in one position in Fig. 10 and in another position in Fig. 7, and rigidly fastened to the cam 101, indicates on a suitable dial 110 the maximum amount of feed which can be imparted at any given time to the ratchet 91 by the pawl 90. Thus if the thumb-nut 105 be turned to loosen the cam 101 on the sleeve 93, and if the pointer 109 be turned to the position shown in Fig. 7 and there locked, this indicates that the lip 106 of the lever 107 is engaging the lowest part of the cam 101 and that the maximum feed is being imparted to the ratchet. As the ratchet turns the sleeve 93, the cam will be turned, thereby pushing down the end of the lever 107 which bears against the cam, and elevating the other end of said lever, thereby reducing the feed. The pointer 109 turning with the cam will move about the dial 110 in a clockwise direction. When the feed has progressed until the three-quarters turn of the ratchet shaft has been made, the highest portion of the cam 101 will be in contact with the lip 106 of the lever 107, the pointer 109 will be at zero on the dial and the feed will have been reduced to zero.

In the event that it is not desired to start with the maximum feed, but to start with a feed of let us say three ratchet teeth per stroke of the pawl, the indicator 109 is turned to the corresponding graduation 3 on the dial and the thumb-nut 111 is screwed down until it has elevated the reciprocating rod 88 sufficiently to take up all lost motion between the lever 107 and the projection 106, against which it bears. The pointer 109 may then be turned back to the point 6 and the cam 101 locked to the sleeve 93 by turning of the thumb-nut 105. If the machine be now started in operation, the feed will be at the rate of three teeth for each point of feed of the machine until the pointer 109 has reached the point "3" on the dial 110, which means that the cam 101 is again effective to depress the lip 106 of the lever 107 and to continue to decrease feed until zero is reached. If it is desired to use a constant feed, the thumb-nut 105 is turned to loosen the cam 101 on the sleeve 93, the pointer 109 is turned to the graduation indicating the amount of feed desired, and the thumb-nut 112 is turned to lock the pointer relative to the dial, thereby preventing rotation of the cam and affording a constant rate of feed.

I have elected to disclose automatic means for terminating the oscillation of the oscillatory table when the required feeding movement has been completed, and to this end I have shown a stop lever 113 (Fig. 7) fulcrumed at 114 on the frame of the machine and adapted, when rocked down about the fulcrum 114, to abut against the projection 115, thereby to prevent the worm cage from shifting, and to hold it in central position.

The stop lever 113 is preferably provided with a handle so that it may be operated manually, and with a lip 116 adapted to be engaged by a catch 117 and a bell-crank lever 118 fulcrumed at 119 on the frame of the machine. When the end 106 of the lever 107 has been sufficiently depressed, the opposite end of the lever 107, which carries the adjusting screw 120, will rock the bell-crank lever 118, causing the catch 117 to release the lip 116, thereby permitting the spring 121 to pull down the stop lever 113 against the projection 115, which is integral with the worm cage (Fig. 17).

To permit a slight longitudinal movement of the tool spindle 4 (Fig. 1) so that the center of the tool may be adjusted to be exactly over the axis of oscillation, I have provided the lug 122 on the bearing for the tool spindle 4, and I have mounted on the tool spindle head 3 a nut 123 and thumb screw 124, so that when the clamp nuts 125 are loosened the work spindle, together with its bearing, may be adjusted axially.

To protect the operator when the wheel is drawn away from the work in the direction of the operator, I have provided a wheel-guard 126 (Figs. 1 and 4), which is carried on a stud 127 projecting from a bracket 128 bolted to the frame of the machine. A similar guard may be mounted on the stud 127 on the opposite side of the work spindle, when the wheel is operating on the opposite side of the work.

Figure 21:
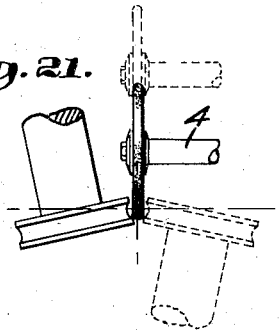
Fig. 21 through Fig. 27 are diagrammatic views illustrating various operations of the machine, and are more fully described hereafter.

Referring now to the diagrammatic Fig. 21, I have shown the relative positioning of the work and tool when grinding external ball races. When the machine is to be used for this purpose, the work spindle 8 and tool spindle 4 are set in the relative axial relationship shown in Fig. 2. The positioning slide 16 being clamped to the feed slide 13 by tightening the hand-nut 35, first making sure that the feed slide abuts against the adjusting screw 37, the feed pinion 94 and the feed gear 95 are connected by the single pinion 98 so that the feed screw will turn in a clockwise direction the same as the ratchet 91. Power may now be applied to the machine, with the pawl 90 held back in inoperative position by being turned ninety degrees. If the stopping latch 113 be raised, the worm cage swings and the worm 43 will engage the worm gear 41 and the oscillation of the table will commence. I have presupposed a proper setting of the reverse tappets 61 and 62 (Fig. 5). If the field of oscillation is not exactly what is desired, this may be adjusted by shifting the tappets 61 and 62 on the oscillatory work support. The hand-feed wheel may now be turned by hand until the grinding wheel is brought in contact with the work. At this time the setting of the slides 11, 12 (Fig. 1) may be checked up to insure the location of the arcuate race in the proper position relative to the bearing. The pointer 109 (Fig. 7) of the feed mechanism may now be turned to any desired position on the dial 110, after which the thumb-nuts 105 (Fig. 10) should be turned to lock the cam 101 and the pointer 109 relative to the ratchet 91. In grinding the first race it is the best practice to so set the pointer 109 that a relatively small amount of metal will be ground away before the automatic cross-feed is terminated by the cam 101. After the work is gaged, the pointer 109 may be set back in the event that the work is oversize. During the gaging of the work, the hand-nut 35 is loosened (Fig. 2), and the handle 32 is raised to move the tool spindle away from the work. If the grinding operation is to be continued, the handle 32 is depressed until the positioning slide 16 abuts against the screw 37. When the work is found to be the proper size, the thumb-nut 105 is left in such a position that the cam 101 is locked relative to the sleeve 93 (Fig. 10), and the hand-feed wheel is turned back an amount approximately equal to the total amount which it has turned during the previous grinding operation. The work is then removed from its chuck, and new work is inserted and the grinding wheel moved forward toward the work by the positioning slide, and there locked. The hand-feed may now be applied until sparks begin to appear between the work and tool, after which the machine may be left to complete the second operation automatically. When the grinding operation is complete, the cam 101 will have depressed the lip 106 of the lever 107 sufficiently to elevate the opposite end of said lever so that the screw 120 will have abutted against and rocked the bell-crank 118, thereby releasing the stopping latch 113, which will be pulled down by the spring 121 until it either abuts against the side of or rests against the surface of the stopping projection 115 on the worm cage. In the event that the worm cage is in such position that the work is facing away from the operator when the stopping latch 113 drops the latch will strike the top of the projection 115, and will remain there ineffectively until the succeeding reversal of the oscillatory mechanism, at which time the stopping latch 113 will abut against the side of the projection 115, thereby holding the worm cage in centered position and stopping the machine facing the operator.

Figure 22:
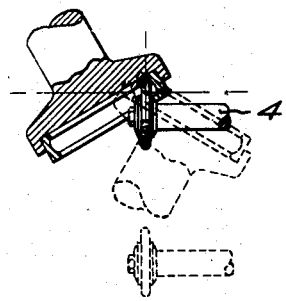

When an interior ball race is to be ground, as shown in diagrammatic Fig. 22, the pin 31 (Fig. 2) is shifted into the hole 40 and the stop 38 is shifted to the opposite end of the T slot 36, so that the whole tool carriage may be shifted to the left, as viewed in Fig 2, by movement on the positioning slide 16. The stop 39 and screw 37 are now properly positioned, and the lever 32 is depressed so that the grinding wheel and spindle will be drawn toward the operator into the guard 126. The work spindle 8 is now properly adjusted so that the axis of the ball race groove will be exactly over the axis of the oscillatory work support. The lever 96 (Fig. 8) is now shifted so that the gear 95 and the feed screw will turn in counter-clockwise direction, thereby tending to feed the wheel away from the operator. The preliminary step of setting the feed mechanism for the first interior ball race to be ground is substantially the same as previously described in connection with the setting of the feed mechanism for the grinding of an exterior race.

Figure 23:
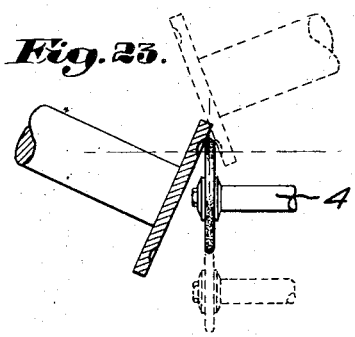

When it is desired to arrange the machine for grinding thrust ball races, as shown in Fig. 23, the tappet support 81 is loosened from the oscillatory work support 5, and the latter (both worms being out of engagement with the worm gear) is swung 90 degrees so that the work faces the operator. During this swinging movement the tappet support is moved a few degrees to the left relative to the oscillatory support. The amount which it need be moved is very slight, because the tappets 61 and 62 are staggered and the number of degrees between them much less than the degrees of oscillation. The tappet support 81 is then clamped on to the oscillatory support 5, and any adjustment of the tappets 61 and 62 which seems necessary or desirable is made. It will be noted in Figs. 3 and 4 that the bottom of the projecting portion of the oscillatory support 5 is above the level of the positioning slide 16. When grinding thrust races the work spindle is located on the same side of the axis of the oscillatory support on which the operator stands, this adjustment being made on the positioning slide and being identical with the adjustment made for grinding internal ball races. This leaves the side of the machine away from the operator sufficiently free of mechanism so that the oscillatory support can swing about a center line transverse to the machine through very nearly as many degrees as it can swing about a center line extending longitudinally of the machine, this being sufficient to grind any ordinary thrust ball race. The operation of the feed and other adjusting mechanism for the grinding of thrust ball races is substantially identical with that already described in connection with interior and exterior ball races.

Figure 24:
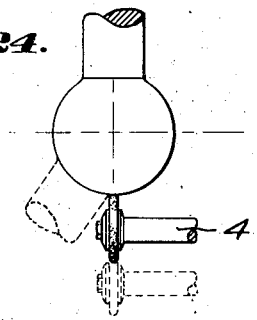

Referring now to Fig. 24, I have shown the relative position of work and tool when it is desired to grind balls for ball and socket joints. The position of the oscillatory support relative to the machine is substantially the same as for the grinding of thrust ball races previously described, and the adjustment of the tappets 61 and 62 to attain the desired field of oscillation needs no description. During the grinding of a ball the grinding wheel is forward toward the operator and is located on the same side of the axis of the oscillatory support as the operator. The work spindle is set over until the stop 200 (Fig. 5) is reached, so that the axis of the spindle is in a plane with the axis of the oscillatory support, and so that the axis of the desired ball is exactly over the oscillatory support. The initial feed-determining operation and subsequent feeding operations are substantially the same as previously described in connection with exterior ball races.

Figure 25:
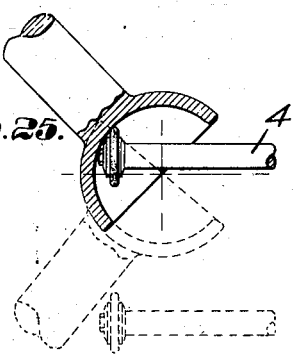

The grinding of a socket is shown in Fig. 25. In this case the axis of the work spindle is again in a plane with the axis of the oscillatory support, and the oscillatory table is in the same position as where internal and external races are to be ground. The work support is adjusted longitudinally of its axis until the axis of the desired socket is directly over the axis of oscillation of the oscillatory support. The positioning slide 16 is left in the same relative position to the feed slide 13 as for grinding external races, but the spindle is advanced sufficiently so that the grinding edge of the wheel projects past the center of oscillation, as shown in diagrammatic Fig. 25. The setting in operation of the feed mechanism is substantially the same as before described.

Figures 26, 27:
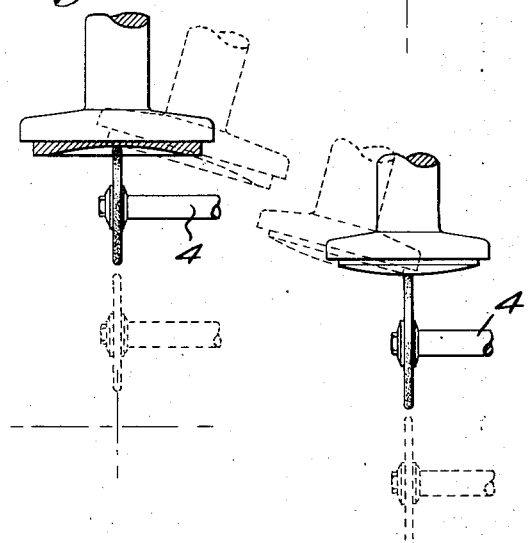

In Figs. 26 and 27 I have illustrated diagrammatically the grinding of the convex and concave elements of a self-alining step bearing.

In Fig. 27 (convex element) the work support is swung to a medial position on the transverse axis of the machine, the work spindle is advanced until the work projects beyond the axis of oscillation an amount slightly exceeding the desired radius. The tool is fed to the work as before described.

In Fig. 26 (concave element) the work support is in the same medial position as in Fig. 27, but the work spindle is retracted until the face of the blank is distant from the axis of oscillation an amount slightly less than the desired radius. The tool is fed to the work as before described.

Without attempting to refer to all of the meritorious features of the grinder here disclosed, or of grinders for other classes of work embodying features of the present invention, I desire to emphasize certain features of importance, particularly in grinders wherein simplicity, durability and rigidity of construction, facility of operation, assembly, disassembly and adjustment, accuracy of work, and flexibility of function, or any of the foregoing is a desideratum.

The use of the cross slide 16, constituting a preferred form of transverse positioning means for separating the work and tool and for bringing them together again, avoids the inaccuracy, interference with belt drive, unnecessary elongation and complexity of the machine, and the danger and inconvenience to the operator from the exposed wheel close to the work, all of which disadvantages occur in the usual constructions wherein the work and tool are separated by movement on a longitudinal slide.

The independence of the positioning slide from the feed mechanism not only permits rapidity of operation of the positioning slide, but permits gaging of the work during an interval in the grinding of a unit of work, with the certainty that, if necessary, the grinding operation may be continued without any chance of spoiling the work by a varied relative positioning of work and tool. Certainty of identical longitudinal relative positioning on successive units of work is also promoted.

The preferred construction of oscillatory support, and its relation to the coöperating non-oscillatory portions of the machine permits a maximum amplitude of oscillation and a maximum variation in the medial field of oscillation. The worm gear and worms coöperating therewith constituting a preferred form of traversing means, permit in the present machine infinite adjustment of the field of oscillation, while contributing to the accuracy of the work by providing a constant speed of relative traverse of work and wheel. From another angle, the preferred form of traversing mechanism is compact, durable, well adapted for protection from dust and grit, easily accommodated to run in an oil bath, and readily reversible by simple, compact and flexible shifting mechanism.

The feed mechanism when actuated by a reversing part, as is preferred, is automatically timed so that feeding movement substantially coincides with reverse of the traversing mechanism, at which time the work and tool are preferably out of contact. The automatic feed reduction means, of which the cam 111 and coöperating parts are a preferred construction, is peculiarly advantageous in any automatic form of grinding mechanism, for the ideal rate of feed may be even more nearly approximated than by manual operation. The flexibility of the feed-controlling mechanism by simple predetermined adjustment for a variety of different feeding operations is of marked advantage, while the automatic stoppage of the traversing mechanism by feed-actuated means enables the operator to attend, if desired, a number of machines. The fact that the automatic stop is only effective at a point of reversal when work and tool are preferably out of contact, is important because this prevents damaging of the work occasioned by continued feed after stoppage, such feed being actuated, not by the feed mechanism, but by the slight deflection of the tool spindle and coöperating parts. While advantageous in any grinder to have the stoppage mechanism effective at one end of the traverse only, it is peculiarly advantageous in an oscillating grinder, for the oscillating head may only be stopped in the desired position, preferably with the work facing the operator, though in machines wherein separation of work and tool is effected by longitudinal movement of the tool spindle it would be advantageous to have such stop mechanism effective to stop the traverse only when the work faces away from the operator. The guards for the tool protect the operator while gaging, removing and inserting work in the chuck on the work spindle, while the relatively great distance between work and tool when the latter is transversely withdrawn toward the operator (in all operations except external annular races) facilitates such gaging, removal and insertion. In this connection it should be noted that the work spindle, when grinding all types of annular races, is located on that side of the axis of oscillation which is toward the operator. While ball races could be ground with the tool spindle on the opposite side of the axis of oscillation, this would be much less convenient.

The stop 200 for the transverse slide of the tool spindle is not only useful in adjusting the position of the tool spindle for grinding spherical work, either concave or convex, but may also serve as an element against which to insert gages for locating this transverse slide when setting up for ball races of different diameters.

While I have shown and described a preferred construction of one embodiment of my invention, it will be understood that major changes involving omission, alteration, substitution and reversal of parts and mechanisms, and even changes in grinding functions performed by the machine as a whole, may be made without departing from the scope of my invention as defined by the claims.

It will also be understood that, while the mechanisms described are peculiarly advantageous when used in combination with each other and in machines for grinding surfaces curved in two dimensions, I do not limit my invention to such combinations or machines or in any way except as defined by the appended claims.

Claims:

1. An oscillatory grinder comprising, in combination, an oscillated spindle carried by an oscillatory support, a fed spindle carried by a feed slide, work retaining means on one of said spindles, grinding wheel retaining means on the other of said spindles, feed mechanism coöperating with said feed slide, and fed spindle positioning means providing for guided movement of said fed spindle in a direction transverse to its axis, while maintaining unchanged the position of said feed mechanism, whereby the work and tool may be separated for gaging the work, and returned to their predetermined relation if further grinding is required.

2. An oscillatory grinder comprising, in combination, a work spindle, an oscillatory support therefor, a tool spindle, feed mechanism, and means independent of said feed mechanism permitting movement of the tool away from the work in a direction transverse to the axis of said tool spindle.

3. An oscillatory grinder comprising, in combination, a work spindle, an oscillatory support therefor, a tool spindle, a transverse feed slide for the tool spindle, a transverse positioning slide operatively interposed between the feed slide and the tool spindle, and locking means for rigidly securing said positioning slide relative to said feed slide.

4. An oscillatory grinder comprising, in combination, a frame, an oscillatory support pivoted in said frame, a work spindle on said oscillatory support, a feed slide on said frame, feed mechanism below said feed slide, a tool spindle carried by said feed slide, a transverse positioning slide interposed between said feed slide and said tool spindle, locking means for rigidly securing said positioning slide to said feed slide, adjustable stop means for determining the relative positioning of said positioning slide to said feed slide during the grinding operation, and manually operable lever means facilitating movement of said positioning slide relative to said feed slide.

5. An oscillating grinder comprising, in combination, an oscillatory work support, a tool spindle means permitting rapid shifting movement of said tool spindle toward the operator and a guard for the tool into which said tool is shifted by such shifting movement.

6. An oscillating grinder comprising, in combination, an oscillatory spindle, a transversely fed spindle, a feed slide therefor, a driven pulley on said transversely fed spindle, and a driving pulley therefor carried by said feed slide whereby the relative position of said pulleys is maintained constant during transverse feeding movement of said feed slide.

7. An oscillating grinder comprising, in combination, an oscillatory spindle, a transversely fed spindle, a feed slide therefor, a positioning slide interposed between said transversely fed spindle and said feed slide, a driven pulley on said transversely fed spindle, and a driving pulley therefor on said positioning slide, whereby the relative position of said pulleys is maintained constant during transverse positioning movement of said positioning slide.

8. An oscillating grinder comprising, in combination, the oscillatory work supports carrying the work, the grinding wheel spindle 4, the cross-feed slide 13, and the cross-positioning slide 16.

9. An oscillating grinder comprising, in combination, an oscillatory support carrying a work spindle, a tool spindle, a cross-feed slide therefor, the top of said feed slide being lower than the bottom of the projecting portion of said oscillatory support.

10. An oscillating grinder comprising, in combination, an oscillatory work support, a grinding wheel spindle adjustable to opposite sides of the axis of oscillation of said work support, said grinding wheel spindle and associated parts, when adjusted toward the front of the machine, permitting oscillation of the axis of said work spindle to a position at least one hundred and thirty-five degrees beyond the longitudinal center line of the machine.

11. An oscillating grinder having a work support, a work spindle carried thereby, and slide means permitting location of said work spindle on one side of the axis of oscillation of said work support for grinding annular grooves, and permitting location of the axis of said work spindle in the same plane as the axis of oscillation of said oscillatory support for grinding balls and sockets.

12. An oscillating grinder comprising, in combination, an oscillatory work support, a rotatable work spindle carried thereby, means for holding the work spindle with its axis in a plane with the axis of the oscillatory support, a tool spindle, means for positioning the tool spindle with its axis slightly to one side of the axis of oscillation, and with the tool advanced axially of the tool spindle to a point beyond the axis of oscillation, and means permitting oscillation of the work support through approximately forty-five degrees each side of the longitudinal center line of the machine, whereby half sockets for ball and socket joints may be ground through approximately one hundred and eighty degrees.

13. An oscillating grinder having an oscillatory work support, a rotatable work spindle carried thereby, a slide transverse to the axis of said work spindle interposed between said oscillatory support and said work spindle, and permitting adjustment of the latter to a position to one side of the axis of oscillation for grinding annular grooves or to a position with its axis in a plane with the axis of oscillation for grinding spherical surfaces, and a second slide alined with said work spindle interposed between said oscillatory support and said work spindle and permitting axial retraction of the work spindle from the axis of oscillation for the grinding of balls or sockets.

14. An oscillating grinder having an oscillatory work support, a work spindle carried thereby, a slide transverse to the axis of said spindle interposed between said oscillatory support and said work spindle, and a stop for limiting adjustment of said spindle on said slide when the axis of the work spindle is in a plane with the axis of oscillation.

15. An oscillatory grinder comprising, in combination, an oscillatory work support, a work spindle carried thereby, driving mechanism for said oscillatory support comprising alternately engaging and disengaging oppositely effective driving elements, two tappets for timing alternate engagement and disengagement of said driving elements, a tappet support carrying both of said tappets, and means for securing said tappet support to said head in a plurality of different positions.

16. An oscillatory grinder comprising, in combination, an oscillatory work support, a work spindle carried thereby, driving mechanism for said oscillatory support comprising alternately engaging and disengaging oppositely effective driving elements, said work support being oscillatable about two medial positions at right angles to one another, two tappets for timing alternate engagement and disengagement of said driving elements, a tappet support carrying both of said tappets, said tappet support being adjustable about the axis of oscillation and relative to the work support.

17. An oscillatory grinder comprising, in combination, an oscillatory support, oscillating mechanism therefor including two alternately engaged, oppositely effective driving elements, two staggered tappets connected to the oscillatory support, two staggered coöperating elements carried by the frame of the machine and having provision for limited tappet actuated movement relative to said frame, and mechanism between said staggered coöperating elements and the driving elements for causing alternate engagement of the latter on movement of the former whereby the number of degrees of angularity between said two tappets relative to the axis of oscillation may be substantially less than the number of degrees of oscillation of the oscillatory support.

18. An oscillating grinder having an oscillating post, a worm gear on said post, two worms for alternate engagement with said post, a cage carrying said worms, a bearing above and below said worm gear, an upper frame carrying said worm gear, said post and the upper of said bearings, a lower frame carrying said cage and said worms and a projection from said upper frame passing through said worm cage, and carrying said lower bearing.

19. A grinder having driving mechanism including a worm gear, two worms carried by a shifting cage for alternate engagement with said worm gear, a driving shaft carried by said worm cage for driving said worms, the axis of said driving shaft being above the axes of said worms, and an oil containing pan for said worms and their bearings, whereby said worms may run in oil without loss thereof around said driving shaft.

20. A grinder having traversing mechanism for actuating relative traverse of work and tool including a shaft carrying a worm gear, two worms for alternate engagement with said worm gear, a worm cage, shafts for said worms having bearings in said worm cage, a pivotal bearing for said worm cage at one end thereof, and longitudinal members for said worm cage connecting said bearings and above said shafts.

21. A grinder having traversing mechanism for actuating relative traverse of work and tool including a shaft carrying a worm gear, two worms for alternate engagement with said worm gear, a worm cage, shafts for said worms having bearings in said worm cage, a pivotal bearing for said worm cage at one end thereof, and longitudinal members for said worm cage connecting said bearings and above said shafts, and a depending projection on the opposite end of said cage for engagement with said cage shifting mechanism.

22. A grinder comprising, in combination, a horizontally divided frame, traversing mechanism for actuating relative traverse of work and tool, including a vertical shaft carrying a worm gear, two horizontal shafts each carrying a worm, a worm cage pivoted to the lower portion of said frame, and carrying said horizontal shafts, said vertical shaft being carried by the upper portion of said frame, whereby said vertical post may be assembled with the upper portion of said frame, said worm cage and parts carried thereby may be assembled with the lower portion of said frame and the two portions of said frame then put together to secure said parts in proper relationship.

23. In a grinder the combination of a work spindle, a tool spindle, traversing means for traversing one of said spindles relative to the other, feed means for feeding one of said spindles relative to the other, and automatic feed reducing means actuated by feeding movement of said feeding means.

24. In a grinder the combination of a feed slide, and feed mechanism including a ratchet, a pawl engaging said ratchet, positive means for actuating movement of said pawl in one direction, yielding means for actuating movement of said pawl in the reverse direction, and means actuated by rotative movement of said pawl for reducing the movement of said pawl in reverse direction.

25. In a grinder the combination of a feed slide and feed mechanism including a ratchet, a pawl engaging said ratchet, positive means for actuating movement of said pawl in ratchet turning direction, yielding means for actuating movement of said pawl on its return stroke, and automatic means for progressively reducing the movement of said pawl on its return stroke.

26. In a grinder the combination of a feed slide and feed mechanism including cam-controlled means for progressively reducing the rate of movement of said feed slide.

27. In a grinder the combination of a feed slide and feed mechanism including cam-controlled progressive feed reducing means and means rendering ineffective a portion of the throw of said cam, whereby automatic constant feed is followed automatically by automatic progressive reduction of feeding movement.

28. In a grinder, the combination of a feed slide, automatic feed mechanism actuating feeding movement thereof, automatic progressive feed reduction means and coöperating means effective at the option of the operator, providing a constant feed prior to automatic initiation of effective operation of said progressive feed reduction means.

29. In a grinder, the combination of a feed slide, automatic feed mechanism actuating feeding movement thereof, automatic progressive feed reduction means and coöperating means effective at the option of the operator, providing a constant feed, adjustable in degree, prior to automatic initiation of effective operation of said progressive feed reduction means.

30. In a grinder, the combination of a feed slide, automatic feed mechanism actuating feeding movement thereof, progressive means for progressively reducing the rate of movement of said feed slide and means effective, at the option of the operator, for throwing said progressive means out of operation and permitting a constant feed.

31. In a grinder, the combination of a feed slide and feed mechanism therefor, including a ratchet, a feed-determining cam, and means for detachably locking said cam for rotation by said ratchet.

32. In a grinder, the combination of a feed slide and feed mechanism, including a ratchet, a feed-determining cam, and means for locking said cam against rotation by said ratchet.

33. In a grinder, the combination of a feed slide and feed mechanism, including a feed-determining rotatable cam, an index secured to said cam for rotation therewith, and a graduated dial coöperating with said index to indicate the amount of feed determined by said cam.

34. In a grinder, the combination of a feed slide, a feed screw therefor, a feed ratchet, and reversing gears operatively interposed between said ratchet and feed screw.

35. In a grinder, the combination of a feed slide, a feed ratchet mounted for automatic rotation in one direction only, and means providing alternative feeding movement of said feed slide in opposite directions by uni-directional automatic rotation of said feed ratchet.

36. In a grinder, the combination of a feed slide, and feed mechanism including a ratchet, a pawl therefor, a feed-reducing cam, a lever rocked by said cam, the rocking of said lever reducing the amplitude of movement of said ratchet.

37. In a grinder, the combination of a reciprocatory pawl-carrying rod, the pawl, a ratchet, a feed-reducing cam, and means coöperating with said rod to modify the operation of said feed-reducing cam.

38. In a grinder, the combination of a shifting element carrying a wedge cam, a pawl carrier moved in one direction by said cam, yielding means actuating movement of said pawl carrier in the opposite direction, and a feed-reducing cam controlling the effective throw of said wedge cam.

39. In a grinder, the combination of traversing mechanism including a shifting worm cage, a lever rocked by shifting movement thereof, and a feed-actuating cam carried by said lever.

40. In a grinder, the combination of traversing mechanism, reversing mechanism, feed means actuated by said reversing mechanism, and progressive feed reduction means automatically operative to reduce feeding movement at both points of reversal of said reversing mechanism.

41. In a grinder, the combination with traversing mechanism of traverse stopping means, which can be set, at the will of the operator, to stop the traversing mechanism at one point of reversal only.

42. In an oscillating grinder, the combination of an oscillatory work support, automatic oscillating means, and a stop controllable by the operator, but effective to stop the oscillating means only when the work is facing the operator.

43. In a grinder, the combination of traversing means, including a shifting worm cage, a projection from said cage, and a pivoted latch, controllable by the operator, for engaging said projection and holding said worm cage in central position, thereby to stop the traverse of said traversing means.

44. In a grinder, the combination of traversing means, feeding means, and means automatically controlled by said feed means for stopping the traverse of said traversing means.

45. In a grinder, the combination of traversing means, feeding means, automatic means for automatically reducing the rate of feed, and means controlled by said automatic means for stopping the traverse of said traversing means.

46. In a grinder, the combination of traversing means, feeding means, automatic feed reduction means, and means insuring stoppage of said traversing means when the feed has been substantially reduced to zero by said feed reduction means.

47. In a grinder, the combination of traversing means, feeding means including an automatically operating feed-reducing cam, a lever rocked by said cam, a traverse stopping element, and a catch holding said stopping element in ineffective position, but adapted to be disengaged from said element by rocking of said lever.

48. In a grinder, the combination of traversing means and automatic reverse mechanism for said traversing means, including a shiftable element alternately moved in opposite directions, spring means actuating such movement, latch means controlling said spring means, and cam means shiftable by the traversed element for controlling said latch means, said cam means providing a portion of relatively slight pitch adjacent the latch releasing portion thereof, whereby spring-actuated movement of the traversed element pursuant to release of said latch means is prevented.

In testimony whereof, I have signed my name to this specification.

FREDERICK H. HALSTEAD.